March 27, 1962 L. HÜTER 3,027,328
PROCESS FOR THE PREPARATION OF ACETONECYANOHYDRIN/SULFURIC
ACID MIXTURES
Filed Dec. 8, 1959
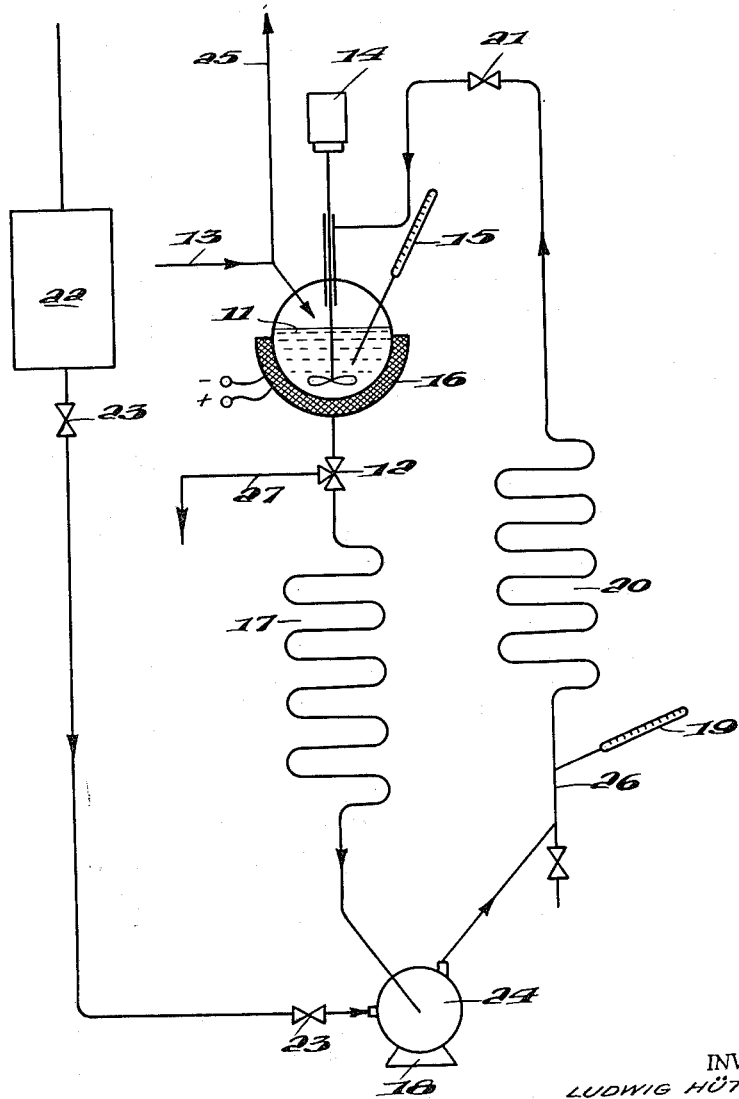
INVENTOR
LUDWIG HÜTER,
BY Bailey, Stephens & Huettig
ATTORNEYS

United States Patent Office 3,027,328
Patented Mar. 27, 1962

3,027,328
PROCESS FOR THE PREPARATION OF ACETONE-CYANOHYDRIN/SULFURIC ACID MIXTURES
Ludwig Hüter, Frankfurt am Main, Germany, assignor to Deutsche Gold- und Silber-Scheideanstalt vormals Roessler, Frankfurt am Main, Germany
Filed Dec. 8, 1959, Ser. No. 858,219
Claims priority, application Germany Dec. 9, 1958
6 Claims. (Cl. 252—188.3)

The present invention relates to an improved process for the preparation of acetonecyanohydrin-sulfuric acid mixtures which are to be used as intermediary reactants in the production of methacrylic acid compounds.

The object of the present invention is to conduct a process for the preparation of acetonecyanohydrin-sulfuric acid mixtures, which are to be used as intermediary reactants in the production of methacrylic acid compounds, during which no acetonecyanohydrin is lost by decomposition.

The accompanying diagram is illustrative of the apparatus used in conducting the test described in Example 2 of this specification.

It is well known to those skilled in the art that alkyl methacrylates or methacrylic acid amide or free methacrylic acid can be produced by the addition of alcohol or ammonia or water, respectively, to the reaction product of a mixture of acetonecyanohydrin and concentrated sulfuric acid. In general, the reaction between the acetonecyanohydrin and the concentrated sulfuric acid is brought about by mixing these two reactants together. However, if these reactants are mixed at higher temperatures, considerable quantities of hydrogen cyanide will be formed, since the hydrogen cyanide partial pressure of the acetonecyanohydrin increases as the temperature rises, particularly in a strong acidic medium. The hydrogen cyanide, thus formed, either escapes from the reaction zone or reacts, according to the familiar reaction, with the sulfuric acid that is present to form carbon monoxide and ammonium sulfate. On the other hand, if the reactants are mixed at lower temperatures, in equimolecular quantities, then the mixture of sulfuric acid and acetonecyanohydrin will always congeal into a crystalline mass which is as hard as stone. Moreover, even if the acetonecyanohydrin is thoroughly stirred into an excess of sulfuric acid there still results a dense, viscous, almost gummy type mass, which can possibly suddenly congeal, into the same type stone hard mass, at temperatures below 60° C. if the excess sulfuric acid present amounts to about 0.25 to 1.5 mols. The use of even larger excesses of sulfuric acid would be injurious to the success of the reaction, since they would decrease the yields. In addition, reaction mixtures of this type can be further processed only with a good deal of difficulty. In order to reliquefy the solid mixture of equimolecular quantities of sulfuric acid monohydrate and acetonecyanohydrin, formed as mentioned above, it would be necessary to subject it to a temperature of 90 to 95° C. Even then, the reliquefication process would consume a good deal of time since the heat conductance properties of these congealed mixtures are very poor.

Processes have been devised which have attempted to avoid the disadvantages relative to the decomposition of the acetonecyanohydrin by maintaining the temperature between 60 to 80° C. during the mixing of the reactants. However, processes of this type are not very satisfactory either, as it is necessary to use an excess of sulfuric acid in them, which diminishes the yields.

Another process was devised which also attempted to avoid the above-mentioned drawbacks. In this process the acetonecyanohydrin was introduced with vigorous agitation into the concentrated sulfuric acid at high speed in order to produce distribution in the finest particle sizes possible. During the mixing of the reactants the temperature of the system was generally maintained between 130 and 160° C., since, even with this rapid blending technique, a congealed stone-hard mass will result at lower temperatures, especially when equimolecular quantities of the reactants are mixed, which is unsatisfactory for the subsequent processing of the reaction mixture. However, at these higher temperatures, the accompanying loss of acetonecyanohydrin due to its decomposition into acetone and hydrogen cyanide must also be contended with. To date, this rapid blending process is still confronted with an acetonecyanohydrin decomposition loss of at least about 2 to 3%.

Furthermore, methacrylic acid esters have been produced by first converting the acetonecyanohydrin with boric acid compounds such as pyroboric acid or boric acid anhydride into the boric acid ester of acetonecyanohydrin in an almost anhydrous medium at temperatures between 30 and 100° C. The boric acid ester mixture is then treated with concentrated acids at elevated temperatures. The formation of a solid stone-hard mixture is avoided by this pre-esterification technique. This technique also succeeds in avoiding the decomposition of the acetonecyanohydrins and leads to the attainment of practical quantitative yields of the end products. On the other hand, this process also displays disadvantages, in that, complicated new separation and purification procedures must be used for the processing of the boric acid derivatives.

It has now been unexpectedly found, according to this invention, that it is possible to produce methacrylic acid compounds in good yields by reacting acetonecyanohydrin with concentrated sulfuric acid and further treating this reaction product with alcohols, ammonia or water and still avoid the disadvantages encountered with the above-mentioned prior art processes. This is accomplished by so conducting the reaction of the acetonecyanohydrin with the concentrated sulfuric acid that a mixture of acetonecyanohydrin and concentrated sulfuric acid containing equimolecular or excess quantities of sulfuric acid is heated for a period of time to a temperature of 80 to 140° C., preferably 100 to 110° C., and thereafter it is quickly quenched to a temperature below 60° C. and additional quantities of acetonecyanohydrin and/or concentrated sulfuric acid, which have also been cooled below 60° C., are then immediately added to the quenched mixture.

The duration of the heating time required for the mixture containing the equimolecular or excess quantities of sulfuric acid depends on the temperature employed. When a temperature is used which lies in the lower limits of the usable temperature range a longer heating time will necessarily be required than if a temperature were used which lies in the upper limits of the usable temperature range. For example, at a temperature of 100 to 110° C. the duration of the heating time is about 15 to 90 minutes.

It is essential for the successful operation of the process according to this invention that the heated acetonecyanohydrin/sulfuric acid mixture by quickly cooled to a temperature below 60° C. This rapid cooling should be accomplished within the time span of a few seconds and at most within several minutes. This cooling process can therefore be described as a quenching process. If the cooling is not carried out quickly enough then the heated acetonecyanohydrin/sulfuric acid mixture can change progressively from a liquid state through a viscous to gelatinous condition into a paste state and even change so much as to be transformed into a stone-hard solid state.

If the mixture of acetonecyanohydrin and sulfuric acid which is to be subjected to the heating and cooling steps is to contain an excess of sulfuric acid, the excess can be added in amounts up to 0.5 mol. This proportion applies to such final mixtures which are subsequently worked with a third component as water, alcohol or ammonia to methacryl compounds.

If the components shall not be added separately, but already premixed to the heated and quenched acetonecyanohydrin/sulfuric acid mixture, such premixtures must be used which at normal temperatures remain in a liquid state.

It is essential that the final mixture to be subsequently worked has the afore-mentioned proportion, whereas the premixtures may have any other proportions between both components when being in a liquid state.

Even if such premixtures having a mol ratio of, for instance, 2:1 or 1:2 are used so that the proportion in the final solution is always about 1:1, no solid phase is formed.

It is not necessary to add such mixture in the calculated quantities all at once. This can be done by adding the prepared mixture in two or more separate portions.

The concentrated sulfuric acid used in the present invention, as well as that referred to in the prior art processes, is in general, 100% sulfuric acid.

The end product obtained by the reaction of acetonecyanohydrin and sulfuric acid in accordance with this invention can be further processed to produce the methacrylic acid compounds by well known techniques, for example, by heating and reacting them with alcohols, ammonia or water.

No acetonecyanohydrin decomposition products of any type, such as, hydrogen cyanide, carbon monoxide or ammonia, are formed during the process of this invention. Consequently, there are no polymerizates formed to discolor the reaction solution or the final product. The by-products produced during the reaction, such as ammonium hydrogen sulfate or ammonium sulfate, are pure white, and can be used for other purposes, after being recovered from the reaction solution, without the need of further purification. In addition, no solidification of the acetonecyanohydrin/sulfuric acid takes place.

A further advantage of the process of this invention consists in that it is capable of being adapted to run on a continuous basis and still yield the best possible results. To this end, it is advantageous to so proceed that additional quantities of acetonecyanohydrin and/or sulfuric acid are added continuously to an excess quantity of a mixture of acetonecyanohydrin and sulfuric acid which is continuously being successively heated to temperatures of 80 to 140° C., preferably 100 to 110° C., and then cooled to temperatures below 60° C. This continuous process can proceed, for example, according to the principle of a heat pump, supplemented where necessary with a circulating pump. The principles involved in the use of such an apparatus are illustrated in the accompanying diagram showing the equipment layout used in a continuous operation of the process of this invention as described in Example 2, below.

The best results are obtained with the process of this invention if the quantities of acetonecyanohydrin and/or sulfuric acid that are added subsequently are so regulated that the mol ratio of acetonecyanohydrin to sulfuric acid in the final end mixture is 1:1. Final mixtures having this 1:1 mol ratio are especially suited for use in the further reactions required to produce the desired methacrylic acid compounds. In this regard, it is however also possible to use final mixtures which contain the acetonecyanohydrin and sulfuric acid in a 1:>1 mol ratio with good results.

The following examples will serve to illustrate several embodiments of the invention:

*Example 1*

A liquid mixture of 196 g. of 100% sulfuric acid and 85 g. of acetonecyanohydrin (mol ratio: 2 to 1) was allowed to react at a temperature of 25° C. while the resulting exothermic heat was simultaneously being removed. This mixture was then heated for one hour at 100° C. and then quickly cooled to room temperature. To this mixture there was then added one-half of another liquid mixture composed of 98 g. of 100% sulfuric acid and 170 g. of acetonecyanohydrin (mol ratio: 1 to 2) which was produced at a temperature of 25° C. while the resulting exothermic heat was simultaneously being removed. No solidification resulted from the blending of these two acetonecyanohydrin/sulfuric acid mixtures. This combined mixture was then heated for 50 minutes at 100° C. and subsequently quenched to room temperature. This cooled combined mixture, in turn, was similarly reacted with the remaining second half of the 1 to 2 mol ratio sulfuric acid/acetonecyanohydrin mixture. Although the acetonecyanohydrin and sulfuric acid were now present in the final mixture in a 1:1 mol ratio, no solidification of the mixture occurred at any point during the whole process and furthermore, no decomposition of the acetonecyanohydrin occurred either.

*Example 2*

The accompanying diagram is a flow sheet of the apparatus used in conducting this test, which is a continuous mode of operation of the process of this invention.

1000 g. (10.2 mols) of 100% sulfuric acid were placed in a triple necked flask 11 which was outfitted with a lower drain 12, a liquid feed line 13, a motor propelled stirrer 14 and a thermometer 15 which has a ground joint. The contents of the flask 11 were continuously recycled from the flask 11 through the three way drain cock 12, water cooler 17, glass vane pump 18, line 26 equipped with a thermometer 19, a second cooler 20, and control valve 21 back to the flask 11 in a closed circuit. The recirculation was so regulated by means of control valve 21 that the entire contents of the flask were recycled about once during the course of one hour. A total amount of 10.2 mols of acetonecyanohydrin were also introduced into storage tank 22 from which it was continuously metered out at the rate of about 2 mols per hour through control devices 23 into the mixing chamber 24 of pump 18. After the acetonecyanohydrin had been continuously admixed with the recirculating sulfuric acid for about one hour the resulting sulfuric acid-acetonecyanohydrin mixture in flask 11 was heated up to 100–110° C. by means of heating mantle 16. After it had been heated in flask 11 the continuously recycling mixture was cooled quickly in cooler 17 in such a controlled fashion that thermometer 19 never registered a temperature higher than 50° C. After about 5 hours, the entire 10.2 mol charge of acetonecyanohydrin had been completely introduced into the recycling acetonecyanohydrin-sulfuric acid mixture from storage tank 22. At this point in the continuous process the mixture of acetonecyanohydrin and sulfuric acid that was present in flask 11 was equimolecular in composition and it was then removed from the recirculation system at the rate of 366 g./hour, at a temperature of about 100° C., through three way cock valve 12 and line 27. In order to maintain the continuity of the process, 196 g. of 100% sulfuric acid and 170 g. of acetonecyanohydrin were introduced into the system over inlets 13 and 23, respectively, for every 366 g. of the equimolecular mixture that were removed.

Throughout the process the mixture remained clear and fluid. The presence of gases, such as, carbon monoxide or even detectable quantities of hydrogen cyanide, which would have been indicative of a decomposition of the acetonecyanohydrin, could not be detected in ventilating line 25.

An aliquot portion of the final equimolecular mixture of sulfuric acid and acetonecyanohydrin congealed into a solid crystalline mass within 24 hours when allowed to stand at room temperature and cool off slowly.

The continuously produced equimolecular mixture of acetonecyanohydrin and sulfuric acid was then further reacted with methanol according to well known procedures to produce methyl methacrylate.

It is essential for a successful working of the process according to the invention that for the blending step temperatures below 60° and for the heating step temperatures below 110° are observed. The temperature of the blending step is limited downwards by the increase of viscosity of the components at sinking temperatures, a working below 0° C. is therefore not recommendable. The heating step may be processed at temperature between 60 to 110° C., preferably at 80 to 100° C. Only the observance of these temperatures will guarantee that the acetonecyanohydrin will not decompose and that in the subsequent working of the mixtures those losses in the yield will surely be avoided which, in the well known processes, necessarily derive from the destruction of acetonecyanohydrin.

It is known in the art that in mixing sulfuric acid and acetonecyanoehydrin an exothermic chemical reaction is effected. The expression "mixture" or "admixture" in the specification refers to the well known reaction mixture, some times called "methacryloamide-sulfate" in the literature.

I claim:

1. In a process for the preparation of a reaction mixture of acetonecyanohydrin and concentrated sulfuric acid to be used as an intermediate in the production of methacrylic acid compounds, the improvement comprising compounding a liquid mixture consisting of acetonecyanohydrin and at least equimolecular proportions of concentrated sulfuric acid at a temperature below 60° C., heating said liquid mixture to a temperature of 80 to 140° C., quenching said hot liquid mixture to a temperature below 60° C. and immediately adding additional quantities of at least one of said liquid mixture components to said liquid mixture so that said intermediate has an acetonecyanohydrin to sulfuric mol ratio of about 1:1, said additional quantities being at a temperature below 60° C.

2. A process as in claim 1 in which said heating is conducted at a temperature of 100 to 110° C.

3. In a process for the preparation of a reaction mixture of acetonecyanohydrin and concentrated sulfuric acid to be used as an intermediate in the production of methacrylic acid compounds, the improvement comprising compounding a liquid mixture consisting of acetonecyanohydrin and at least equimolecular proportions of concentrated sulfuric acid at a temperature below 60° C., heating said liquid mixture to a temperature of 80 to 140° C., quenching said hot liquid mixture to a temperature below 60° C., preparing additional liquid quantities of at least one of said liquid mixture components at a temperature below 60° C., admixing at least one portion of said additional quantities of said components with said liquid mixture at a temperature below 60° C., heating said admixture of each said portion of said additional quantities of said components and said liquid mixture to a temperature of 80 to 140° C. and quenching each said hot admixture to a temperature below 60° C., the amount of said additional quantities of said components admixed with said liquid mixture are such that said intermediate has an acetonecyanohydrin to sulfuric acid mol ratio of about 1:1.

4. A process as in claim 3 in which said heating is conducted at a temperature of 100 to 110° C.

5. A continuous process for the preparation of a reaction mixture of acetonecyanohydrin and concentrated sulfuric acid to be used as an intermediate in the production of methacrylic acid compounds comprising continuously circulating a liquid reaction mixture of acetonecyanohydrin and sulfuric acid in a molar proportion of 1:1 in a cycle, continuously removing a portion of said circulated liquid mixture from said cycle to be processed further to produce said methacrylic acid compounds, continuously admixing additional quantities of said liquid mixture components with said circulating liquid mixture in said cycle, said additional quantities being sufficient to maintain the composition and volume of said circulating liquid mixture in said cycle, heating said circulating liquid mixture at one point in said cycle to a temperature between 80 and 140° C. and quenching said heated circulating liquid mixture to a temperature below 60° C., at least one of said liquid mixture components being additionally admixed while said circulating liquid mixture is at said temperature below 60° C.

6. A process as in claim 5 in which said heating is conducted at a temperature of 100 to 110° C.

References Cited in the file of this patent

UNITED STATES PATENTS

| | | |
|---|---|---|
| 1,581,621 | Tusler | Apr. 20, 1926 |
| 2,026,894 | Hill | Jan. 7, 1936 |
| 2,042,458 | Crawford et al. | June 2, 1936 |
| 2,101,822 | Crawford et al. | Dec. 7, 1937 |
| 2,140,469 | Crawford et al. | Dec. 13, 1938 |
| 2,229,897 | Migrdichian | Jan. 28, 1941 |
| 2,628,977 | Grisby | Feb. 17, 1953 |
| 2,938,053 | Blake et al. | May 24, 1960 |